C. L. BAIR.
BOW TOP HOLDER FOR VEHICLE TOPS CONTRACTED AT REAR.
APPLICATION FILED MAY 29, 1916.
1,267,736.
Patented May 28, 1918.
2 SHEETS—SHEET 1.
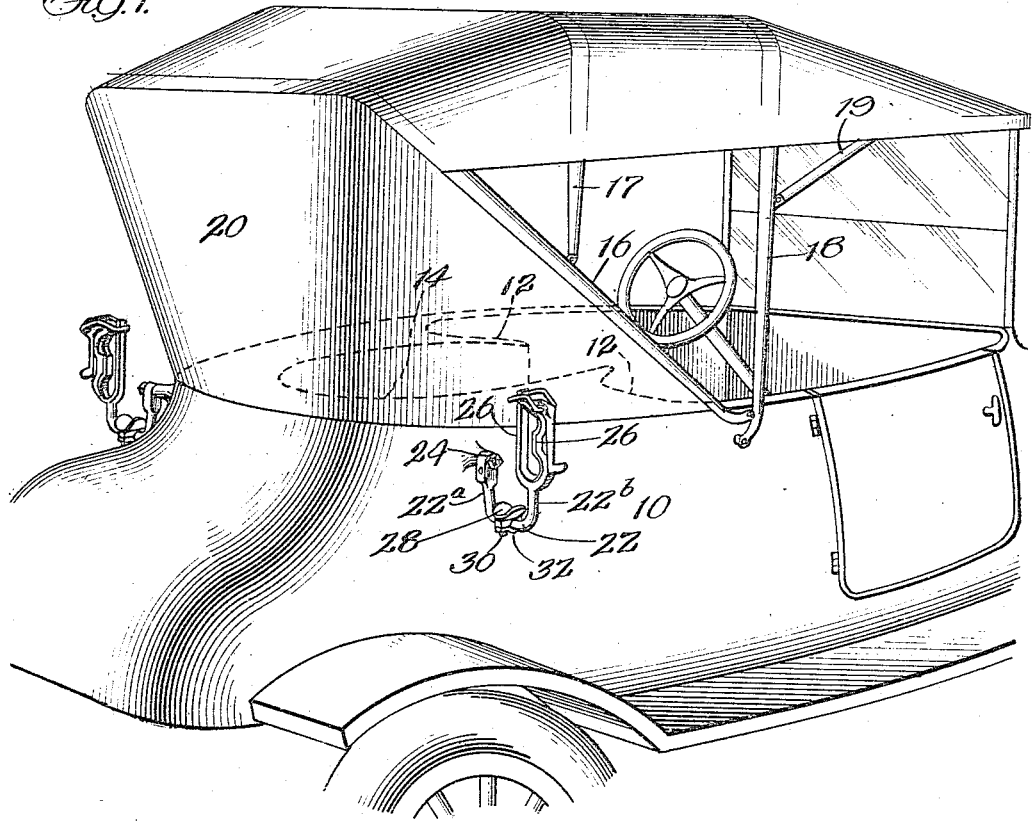
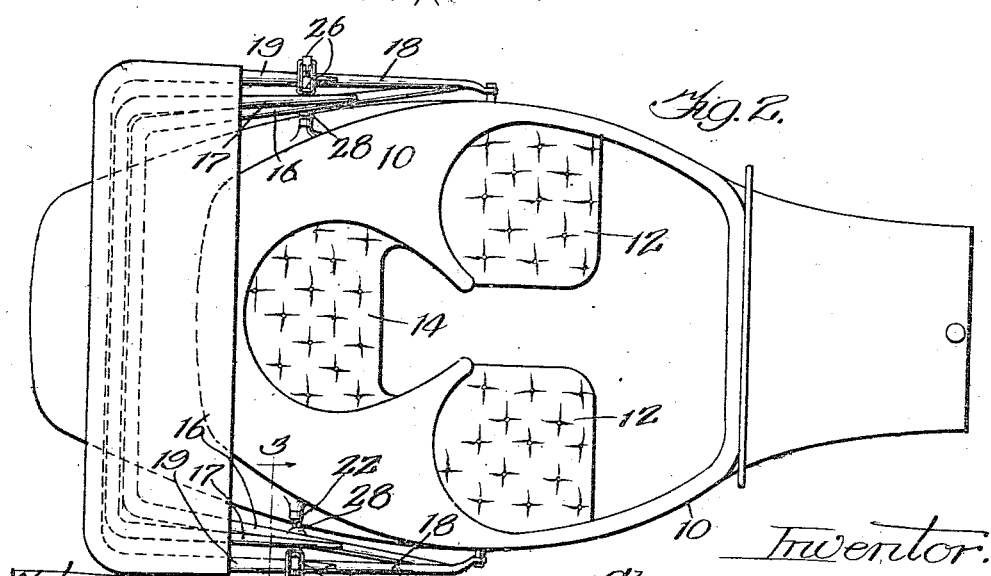
Inventor:
Clarence L. Bair.
By Cheever & Cox
Attys.

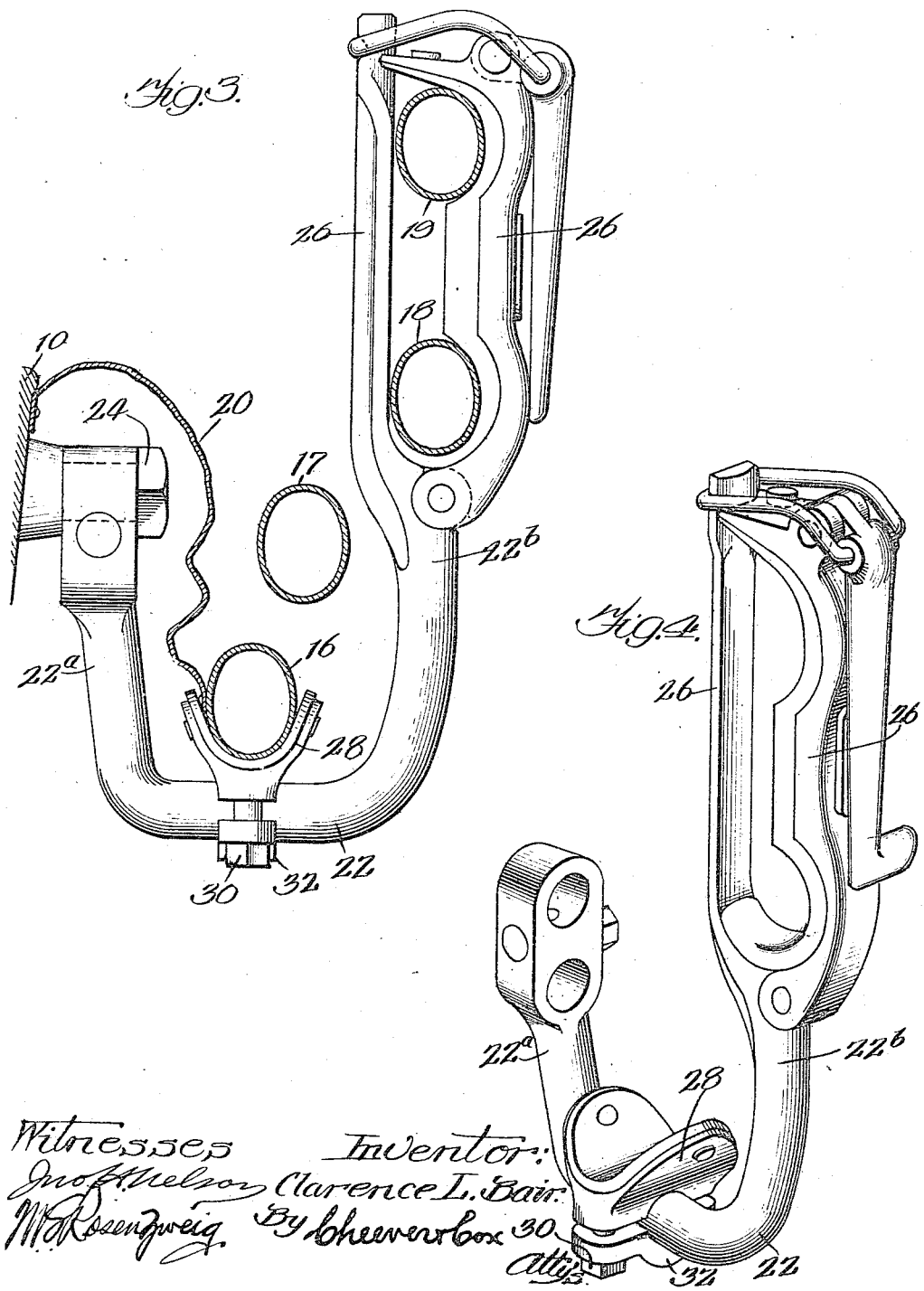

UNITED STATES PATENT OFFICE.

CLARENCE L. BAIR, OF DETROIT, MICHIGAN, ASSIGNOR TO AUTO SPECIALTIES MANUFACTURING CO., OF ST. JOSEPH, MICHIGAN, A CORPORATION OF CALIFORNIA.

BOW-TOP HOLDER FOR VEHICLE-TOPS CONTRACTED AT REAR.

1,267,736.   Specification of Letters Patent.   Patented May 28, 1918.

Application filed May 29, 1916.   Serial No. 100,500.

*To all whom it may concern:*

Be it known that I, CLARENCE L. BAIR, a citizen of the United States, residing at Detroit, in the county of Wayne and State of Michigan, have invented a certain new and useful Improvement in Bow-Top Holders for Vehicle-Tops Contracted at Rear, of which the following is a specification.

This invention relates to devices for holding the bows of the top of an automobile or other vehicle in such a position when the top is closed that wear and chafing of the bows will not take place. When an ordinary vehicle top having all of the bows on a given side of the vehicle lying in a common plane is used, the problem is solved by devices of the type of my prior Patent Number 1,010,110, dated November 28, 1911. Recently, however, automobile manufacturers have been constructing automobile bodies for the use of three people in what is known as the "clover leaf" form, shown in plan view in Figure 2 of the drawings with one seat behind and in the center line between the two front seats, and have been providing vehicles of this type with tops contracted at the rear to more or less artistically inclose this peculiarly shaped vehicle body. In tops applied to this sort of vehicle body, the side portions of the bows located on a given side of the vehicle are located in different planes and are at different distances from the center of the vehicle.

The object of this invention is to provide a bow top holder for use on a vehicle of this class which will support the bows of a top operating in different parallel planes to such an extent as may be desirable; *i. e.*, support as many of the bows as necessary, though not necessarily all of them, and, at the same time, provide for adjustment of parts of the device, so as to make it applicable to vehicle tops having slightly different spacings of the bows occurring accidentally or otherwise.

The invention consists in a device capable of carrying out the foregoing objects; which can be easily and cheaply made and installed; which is satisfactory in operation, and not readily liable to get out of order.

The invention further consists in the special features and details of construction which will be hereafter more fully set forth in the specification and claims.

Referring to the drawings, in which similar numerals indicate the same parts throughout the several views, Fig. 1 is a perspective view of a "clover leaf" vehicle, body and top having the device of this invention applied thereto ready to receive the bows of the top.

Fig. 2 is a plan view showing the position of all the parts when the top is lowered and the bows secured in position.

Fig. 3 is a side view of the preferred form of device showing the folded in position of the bows of the top, taken on the line 3—3 of Fig. 2.

Fig. 4 is a perspective view of the same device removed from the vehicle.

The "clover leaf" vehicle body 10, comprising the two front seats 12 and the rear seat 14, is, as shown, covered with a top having bows 16, 17, 18 and 19, the back of the top being closed by a continuous rear curtain 20 attached, as clearly appears in Figs. 1 and 3, to the bottom bow 16 and to the vehicle body 10. The side members of the bow 16, and incidentally the bow 17, do not move in the same vertical planes as bows 18 and 19, and it is necessary to take care of the solid curtain 20, which cannot be inclosed within any bow holder even were one provided of such a size and shape as to completely inclose all four of the bows.

In order to solve all of the problems set forth, the device shown in the figures is provided, comprising a U-shaped frame 22 having one arm 22ª secured to the vehicle body 10 by any suitable means, such, for instance, as the nut 24, and having opposite to arm 22ª another vertical arm 22ᵇ, on the upper end of which there is attached a bow holder 26 of the general type shown in my said prior Patent, Number 1,010,110, designed to inclose and hold the two bows 18 and 19, which move in a common vertical plane. The length of the bottom arm of the frame 22 is of sufficient width so that the bows 16 and 17 can pass into the space between arms 22ª and 22ᵇ without interference with the bow holder 26. Slidably mounted on the bottom member of frame 22 is a U-shaped cradle 28, detachably secured in position by any suitable means to receive the bow 16. In the particular case here shown in the drawings, this cradle is attached by screws or bolts 30 passing through the opposite end of a yoke 32.

The construction described provides a rigid support for the bottom bow 16 in a position wherein the curtain 20 is taken care of, and because of the fact that the bows 16 and 17 are in operative relation with the bows 18 and 19 through the top, the fact that these bows 18 and 19 are rigidly held in position within the bow holder 26 serves to hold the bow 16 on the cradle 28 and thus prevent rattling or chafing of any of the parts.

The locking device applied to the upper end of swinging arm 26 is reserved for and claimed in my prior application, Ser. No. 72,624, filed January 17, 1916.

Having thus described my invention, what I claim as new and desire to secure by Letters Patent, is:—

1. A vehicle bow top holder comprising an arm, means for securing said arm to the side of a vehicle, so that it extends a substantial distance from said vehicle, means on the end of the arm which is away from the vehicle for detachably retaining a vehicle top bow in rigid position with reference thereto, and means on said arm intermediate between its ends for supporting another vehicle top bow.

2. A vehicle bow top holder, comprising an arm, means for securing said arm to the side of a vehicle, so that it extends a substantial distance from said vehicle, means on the end of the arm which is away from the vehicle for detachably retaining a vehicle top bow in rigid position with reference thereto, means on said arm intermediate between its ends for supporting another vehicle top bow, and means for adjusting said intermediate supporting means lengthwise of the supporting arm.

3. A vehicle bow top holder, comprising a generally U-shaped frame, means for connecting one arm of said U-shaped frame to the body of a vehicle, means on the other arm of said U-shaped frame for receiving and retaining a bow of a vehicle top, and a support for a vehicle top mounted upon the portion of the U-shaped member intermediate between its arms, for the purposes set forth.

4. A vehicle bow top holder, comprising a generally U-shaped frame, means for connecting one arm of said U-shaped frame to the body of a vehicle, means on the other arm of said U-shaped frame for receiving and retaining a bow of a vehicle top, a support for a vehicle top mounted upon the portion of the U-shaped member intermediate between its arms, and means for adjusting said intermediate supporting means lengthwise of the supporting arm, for the purposes set forth.

5. In a device of the class described, in combination with a vehicle, a U-shaped frame open at its top, having one of its arms secured to said vehicle in such a position that the general plane of the U-shaped frame is at right angles to the side of the vehicle, means on the other arm of said frame for detachably securing a bow of a vehicle top thereto, and a support on the intermediate portion of the U-shaped frame for receiving and retaining another top bow.

6. In a device of the class described, in combination with a vehicle, a U-shaped frame open at its top, having one of its arms secured to said vehicle in such a position that the general plane of the U-shaped frame is at right angles to the side of the vehicle, means on the other arm of said frame for detachably securing a bow of a vehicle top thereto, a support on the intermediate portion of the U-shaped frame for receiving and retaining another top bow, the portion of the U-shaped frame on which the last metioned support is provided being substantially below the point of application of the device to the vehicle and the first mentioned bow securing device.

In witness whereof, I have hereunto subscribed my name in the presence of two witnesses.

CLARENCE L. BAIR.

Witnesses:
DWIGHT B. CHEEVER,
M. S. ROSENZWEIG.

Copies of this patent may be obtained for five cents each, by addressing the "Commissioner of Patents. Washington, D. C."